(12) United States Patent
Hofmann

(10) Patent No.: US 8,807,551 B2
(45) Date of Patent: Aug. 19, 2014

(54) CLAMPING SYSTEM

(75) Inventor: Klaus Hofmann, Bruck (DE)

(73) Assignee: ZeroClamp GmbH, Icking (DE)

( * ) Notice: Subject to any disclaimer, the term of this patent is extended or adjusted under 35 U.S.C. 154(b) by 707 days.

(21) Appl. No.: 13/132,864

(22) PCT Filed: Nov. 27, 2009

(86) PCT No.: PCT/DE2009/001691
§ 371 (c)(1),
(2), (4) Date: Jul. 1, 2011

(87) PCT Pub. No.: WO2010/063268
PCT Pub. Date: Jun. 10, 2010

(65) Prior Publication Data
US 2011/0309561 A1    Dec. 22, 2011

(30) Foreign Application Priority Data
Dec. 3, 2008 (DE) .......................... 10 2008 060 126

(51) Int. Cl.
| | | |
|---|---|---|
| B23Q 3/00 | (2006.01) | |
| B25B 1/00 | (2006.01) | |
| B23Q 1/64 | (2006.01) | |
| B25B 1/02 | (2006.01) | |
| B25B 5/02 | (2006.01) | |
| B25B 1/24 | (2006.01) | |
| B23Q 1/03 | (2006.01) | |
| B25B 1/12 | (2006.01) | |

(52) U.S. Cl.
CPC ................. *B25B 1/12* (2013.01); *B25B 1/2405* (2013.01); *B23Q 1/037* (2013.01)
USPC .............................. 269/203; 269/20; 269/56

(58) Field of Classification Search
USPC .......................................... 269/203
See application file for complete search history.

(56) References Cited

U.S. PATENT DOCUMENTS

| | | |
|---|---|---|
| 3,837,261 A | 9/1974 | Hoddinott |
| 5,031,887 A | 7/1991 | Johanson |
| 6,659,439 B1 | 12/2003 | Baumgartner et al. |
| 2010/0187737 A1* | 7/2010 | Marrinan et al. ............... 269/56 |
| 2013/0234382 A1* | 9/2013 | Hofmann ....................... 269/20 |

FOREIGN PATENT DOCUMENTS

| | | |
|---|---|---|
| AT | 509260 B1 * | 12/2009 |
| CN | 2759696 Y | 2/2006 |
| DE | 89 04 334 U1 | 5/1989 |
| DE | 272 817 A1 | 10/1989 |

(Continued)

OTHER PUBLICATIONS

PCT, Written Opinion of the International Search Authority for PCT Application No. PCT/DE2009/001691 dated Apr. 20, 2010 (5 pages).

(Continued)

*Primary Examiner* — Lee D Wilson
*Assistant Examiner* — Alvin Grant
(74) *Attorney, Agent, or Firm* — The Culbertson Group, P.C.

(57) ABSTRACT

A clamping system for the purpose of securing clamping blocks in place on a clamping bar, wherein each clamping block comprises at least one swivel element with a clamping lever disposed thereon, which swivel element laterally projects from the clamping bar, thereby making it possible for the clamping lever to engage in a recess or under a projection of the clamping bar where it is able to interact with the clamping bar, thus producing a clamped connection.

20 Claims, 7 Drawing Sheets

(56) References Cited

FOREIGN PATENT DOCUMENTS

| DE | 44 38 948 A1 | 5/1996 |
| DE | 102005028794 B3 * | 9/2006 |
| DE | 102010037547 A1 * | 3/2012 |
| DE | 10321897 B4 * | 8/2013 |
| JP | S49133878 U | 11/1974 |
| JP | 51 131000 A | 11/1976 |
| JP | S59105340 U | 7/1984 |
| JP | S6274934 U | 5/1987 |
| JP | H0261537 U | 5/1990 |
| JP | H0938737 A | 2/1997 |
| WO | WO 2007/031296 A1 | 3/2007 |
| WO | WO 2012048701 A2 * | 4/2012 |

OTHER PUBLICATIONS

PCT, International Search Report for PCT Application No. PCT/DE2009/001691 dated Apr. 20, 2010 (3 pages).

SIPO, First Notification of Office Action issued Feb. 8, 2013 in corresponding Chinese Patent Application No. 200980148643.8. (13 pages).

JPO, Notification of Reasons for Refusal issued Nov. 11, 2013 in corresponding Japanese Patent Application No. 2011-538831 (10 pages).

* cited by examiner

CLAMPING SYSTEM

TECHNICAL FIELD OF THE INVENTION

The present invention relates to a clamping system, in particular for the purpose of temporarily attaching workpieces.

BACKGROUND OF THE INVENTION

In the field of, inter alia, machine tools, it is known to temporarily secure workpieces in place within the effective range of a tool so as to be able to work on the workpiece. Also known is the principle of securing workpieces in place on clamping bars by clamping them between two clamping blocks or between at least one clamping block and one permanently fixed stop. In the released position, the clamping block can be moved relative to the clamping bar or it can be removed. Preferably, this clamping block can be steplessly secured in place along and on the clamping bar, with a separate clamping unit within the clamping block causing the workpiece that is to be attached to be axially clamped in the longitudinal direction of the clamping bars.

In the prior art, the temporary attachment of the clamping blocks on the clamping bars is labor-intensive and often the clamping forces are inadequate.

Thus, the problem to be solved by the present invention is to make available a clamping system for temporarily securing clamping blocks especially easily and effectively in place on a clamping bar. The objective is that clamping and releasing be carried out quickly and easily.

SUMMARY OF THE INVENTION

A clamping system according to one form of the present invention includes a clamping block having swivel elements that laterally embrace the clamping bar. These swivel elements make possible an especially easy and effective clamping arrangement in that a segment of a lever that is disposed on the swivel element reaches behind an area of the clamping bar and, in the clamped position, preferably exerts a clamping force on this area. According to this form of the present invention, in the released position, the clamping block can be mounted on the clamping bar from the top, and the swivel elements can then be pivoted downward by a certain amount so that the lever segment, which will be described in detail below, reaches behind the clamping bar or a projection on the clamping bar and allows the clamping block to be clamped against the clamping bar.

The clamping force to be exerted can be conveniently adjusted from above (i.e., from the direction from which the clamping block had been mounted prior thereto). Lateral access to the swivel elements is not required, which overall makes it considerably easier and faster to handle the clamping system.

To this end, a first embodiment of the clamping system according to the present invention comprises a clamping bar which extends in a longitudinal direction x, in a lateral direction y at right angles to the longitudinal direction and in a depth z perpendicular to the longitudinal and lateral direction. The clamping bar, which preferably has a rectangular shape, has an upper surface on which one or more clamping blocks can be temporarily secured in place, by means of which the workpiece can be clamped in. In the released position, a clamping block according to the present invention can be removed (preferably in a vertical upward direction) from the clamping bar or mounted on it, and in the clamped position, the clamping block and the clamping bar are tightly connected to each other and, especially in the x-direction, are secured in place relative to each other.

The clamping block comprises a base body which forms the base element for the subsequent securement of the workpiece in place. In addition, the clamping block comprises at least one, but typically two oppositely disposed swivel elements which can swivel about an axis of rotation relative to the base body.

Ingeniously disposed on the swivel element is a clamping lever, the first lever segment of which, in the clamped position, interacts with an area of the clamping bar. Preferably (but not mandatorily) the lever segment exerts a clamping force on the clamping bar so as to clamp the clamping block onto the clamping bar. To this end, the swivel element is movable so that, in order to facilitate mounting on or removal from the clamping bar, it can be swiveled by a certain amount so that the lever segment no longer reaches behind or acts upon the associated segment of the clamping bar, thus allowing the clamping block to be freely pulled off in an upward direction. Conversely, when the swivel elements are swiveled outward, the clamping block can be easily mounted from the top onto the clamping bar so that the swivel elements can subsequently be swiveled inward by a certain amount in such a manner that now the lever segment mentioned above reaches behind a projection or a segment of the clamping bar, thereby ensuring that the clamping block is safeguarded against removal in the vertical direction.

In addition, a clamping force can be exerted on the clamping lever, in a manner yet to be described below, so that the clamping block is pulled to the upper surface of the clamping bar, thus ensuring an additional especially firm grip.

In the clamped position, the swivel element, preferably extends along the side of the clamping bar by a certain amount in the z-direction, with the first lever segment of the clamping lever reaching behind a projection that extends laterally in the y-direction or reaching under a lower edge of the clamping bar. The projection can be formed, in particular, by a longitudinal groove extending in the x-direction in the clamping bar.

The axis of rotation of the swivel element preferably extends parallel to the longitudinal direction x of the clamping bar.

The clamping forces prevailing in the clamping lever are transmitted by way of the swivel element into the base body of the clamping block on the upper surface of the clamping bar. To this end, it is desirable that the swivel element be mounted especially stably and free from play relative to the base body. According to the present invention, to create a stable swivel joint, the swivel element therefore comprises a projection, the cross section of which has the shape of circular segment, which projection can be inserted into a complementary recess in the base body. As the figures illustrate, a swivel joint that is designed as described can be inserted along the x-direction into the associated recess in the base body. The swivel element is subsequently securely and stably mounted in the base body across the entire x-width of the projection or the swivel joint (given an appropriate choice of diameter and production tolerances of the projection). At the same time, this type of swivel bearing does not require any additional components and can be very easily disassembled, for example, for service and maintenance purposes.

In one embodiment of the present invention, a segment of a clamping lever interacts with the clamping bar so as to transmit a clamping force onto the clamping bar and thus to ensure that the clamping block is secured in place relative to the clamping bar. To exert the desired clamping force, it is useful to provide a clamping element that exerts pressure on the lever in such a manner that this lever clamps down on the clamping bar. The clamping element is preferably disposed on the swivel element and, from there, acts upon the lever that is also disposed on the swivel element in a manner to ensure that the desired clamping force is exerted. The clamping element can take the form, in particular, of a screw that is screwed into a thread of the swivel element, from the lower surface of which swivel element the screw projects and actuates the lever.

The lever may have one arm or two arms. If the lever has one arm, the clamping element acts upon the same side of the fulcrum of the lever on which the lever interacts with the clamping bar. For example, a screw that is screwed into the swivel element could exert a tensile force on the lever below so that the free end of the lever is pushed from below against the projection of the clamping bar.

Alternatively, a two-arm design of the lever is also conceivable. In this case, the clamping element preferably acts upon a lever segment which lies opposite to the lever segment that interacts with the clamping bar beyond a fulcrum of the lever. According to a simple embodiment of this design, a screw that is screwed into a thread of the swivel element projects in a downward direction from the swivel element and thus exerts a downward pressure onto one of the lever arms so that the other lever arm that is located beyond the fulcrum of the lever directs an upward clamping force into the opposite direction against the lower surface of a projecting segment of the clamping bar and thus ensures a secure clamped connection.

The two-arm design of the lever has the advantage, on the one hand, that by utilizing the principles of the lever, the clamping force thus exerted is increased compared to the force exerted by the clamping element. On the other hand, the lever arm that interacts with the clamping bar, along nearly its entire length, is able to completely reach under the clamping bar since the clamping element does not act upon this lever arm but instead on the oppositely disposed lever arm. The lever or, more specifically, its fulcrum can subsequently be disposed so as to be closer to the clamping bar. As a result, the swivel element and thus the entire clamping block can be comparatively narrow in design, which is an advantage considering the frequently cramped space available for securing the workpiece in place.

Instead of a clamping device in the shape of a screw, it is also possible to dispose a quick-release clamping lever device on the swivel element. This device (typically, but not mandatorily) acts with an eccentric mechanism upon the clamping element which can subsequently introduce a tensile force or a pressure into the single-arm or two-arm lever. Compared to the screw as a clamping element, the quick-release clamping lever device allows the clamping block to be even more rapidly clamped to the clamping bar, which may be accomplished even without an additional tool. In addition, the clamping lever device can be easily actuated from above, thus obviating the necessity of providing lateral access.

This preferably applies also to the clamping element in the shape of a screw. The screw is preferably seated in the clamping element in such a manner that its longitudinal axis coincides with, or forms only a negligible acute angle with, this vertical z axis. As a result, it is possible to use a tool (screwdriver, hex wrench, etc.) that can be inserted in the z-direction from above into the screw and to connect the clamping block to, or release it from, the clamping bar, without the need to handle a tool, for example, from one side of the clamping bar or in a horizontal direction.

In an especially useful, because it is very simply constructed, version of the swivel element, the clamping lever is integrally formed in one piece with the swivel lever. In this case, a rib-like connection preferably extends from an upper segment of the swivel element to a lower segment which constitutes the preferably horizontally positioned lever. Depending on the wall thickness of the rib-like connection, the lever connected in one piece thereto can be swiveled with greater ease or with greater difficulty relative to the upper segment of the swivel element in order to obtain the clamping effect desired. The one-piece design has the advantage that the number of components of the clamping block is reduced.

Alternatively, however, the clamping lever can also be connected separately and detachably to the swivel lever in that the lever is connected to the upper segment of the swivel element by way of a suitable swivel joint. The connecting element between the swivel element and the base body can again be formed by the type of joint previously described as an example. FIGS. 6 and 7 show an example of this type of construction.

To secure the clamping block especially securely in place on the clamping bar and, in particular, to ensure that the clamping block can be reproducibly positioned to predetermined x-positions ($x_1, x_2 \ldots$), another useful embodiment of the present invention provides that the clamping bar and the clamping block have locking profiles that are complementary to each other. According to the present invention, in the clamped position, the locking profile of the clamping block engages in the locking profile of the clamping bar, thereby defining the position of the clamping block in the x-direction relative to the clamping bar. This feature makes possible a reproducible positioning in precisely defined positions along the clamping bar since the locking profile specifies an associated positioning pattern.

For example, the locking profile can have a regular pattern, in particular in the manner of a toothed bar. The clamping block can be mounted in predetermined positions on the clamping bar, with the positions being spaced at least two tooth spaces apart. In this manner, after a temporary removal from the clamping bar, the clamping block can be relatively easily remounted exactly in the previous positions since the toothed bar initially predetermines the position with the accuracy of the space between two teeth and, as the profiles continue to mesh in the z-direction, with final accuracy. A marking tape disposed on the upper surface of the clamping bar can additionally facilitate the positioning. Thus, the locking profile makes it possible, without special control measurements, to relatively "roughly" position the clamping block on the clamping bar since the meshing teeth subsequently reproducibly and accurately determine the exact positioning.

An additional advantage of the locking profile according to the present invention pertains to the positive locking fit that is obtained in the x-direction between the clamping block and the clamping bar. As soon as the two complementary locking profiles mesh, it is not possible for them to axially move relative to each other, at least as long as the clamping block is secured in place in the z-direction relative to the clamping bar. The lever, as disclosed by this invention, of the swivel element can ensure such a securement as early as when the lever reaches behind the segment of the clamping bar, without explicitly exerting a clamping force on the clamping bar. In other words: When the production tolerances are sufficiently low, the swivel element with the lever disposed thereon (in cases in which the clamping block is completely inserted into the locking profile of the clamping bar) can be swiveled just far enough so that the lever segment that interacts with the clamping bar sits close to projection of the clamping bar without play but also without a clamping force or with only a low clamping force, thereby ensuring that a vertical relative movement between the clamping block and the clamping bar is effectively avoided. The locking profile ensures the securement in position in the x-direction while the swivel element with its lever is responsible for the securement in the z-direction. In addition, suitable stop devices can provide for a securement in place in the y-direction in order to effectively secure the clamping block overall in place relative to the clamping bar.

According to another useful embodiment of the present invention, the imaginary line of application of the clamping force introduced by the clamping lever into the clamping bar intersects with the axis of rotation of the swivel element. This means that the clamping force which is exerted by the first lever segment on the lower surface of the segment of the clamping bar and which is directed vertically upward in the z-direction extend through the axis of rotation about which the swivel element can be swiveled relative to the base body. This ensures that undefined clamping forces or clamping forces that are directed diagonally relative to the clamping bar are effectively avoided, and the clamping block is theoretically pulled exactly vertically, or in the z-direction, against the clamping bar and is clamped thereon.

These and other advantages and features of the invention will be apparent from the following description of the preferred embodiments, considered along with the accompanying drawings.

BRIEF DESCRIPTION OF THE DRAWINGS

Embodiments of the present invention will be explained by way of an example based on the attached figures. As can be seen.

DESCRIPTION OF ILLUSTRATIVE EMBODIMENTS

Figure 1:
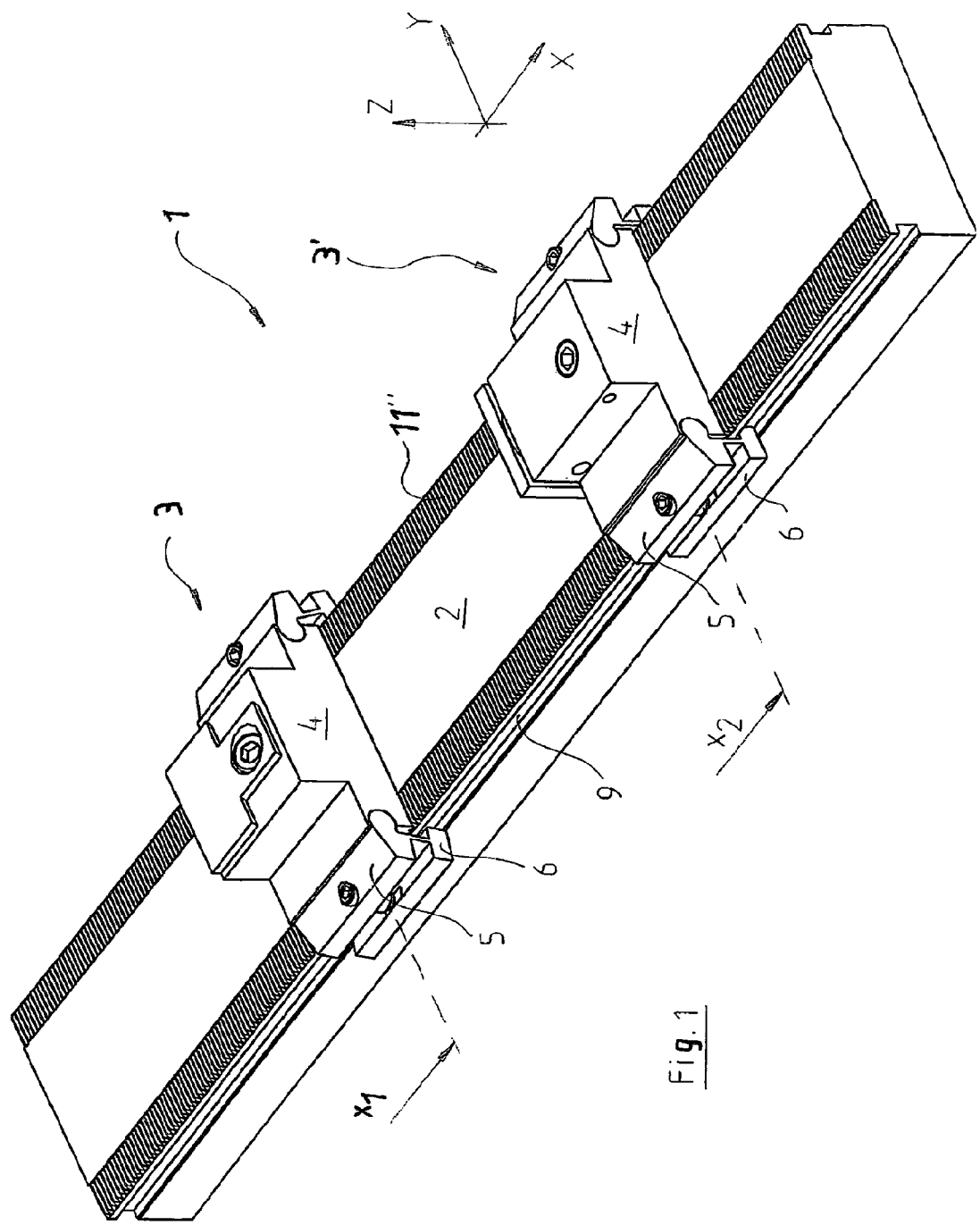
FIG. 1 shows a perspective overall view of the clamping system according to the present invention, comprising two different clamping blocks.

FIG. 1 shows a schematic and perspective view of a clamping system 1 according to one form of the present invention. It comprises a clamping bar 2 which, in an orthogonal system of coordinates, essentially extends along a longitudinal axis x. Two clamping blocks 3, 3' are mounted on the upper surface of the clamping bar 2. The clamping block 3 is designed in the form of a narrow edge clamp and is able to clamp a workpiece (not shown) against a stop device (also not shown) or an additional clamping block on the upper surface of the clamping bar. The clamping block 3' is designed as a parallel clamp and has the same function as the clamping block 3.

One or both clamping blocks 3, 3' are to be detachably secured in place in predetermined positions $x_1$, $x_2$. To this end, the clamping block 3, 3' comprises a base body 4 which extends essentially across the entire width of the clamping bar 2. Disposed on each side of the base body 4 is a swivel element 5 which laterally projects by a certain amount beyond the clamping bar 2. Each swivel element 5 has a clamping lever 6 which extends essentially laterally along the clamping bar 2. The swivel position of the swivel element 5 determines whether or not the clamping lever 6 projects into a groove located in the clamping bar 2.

The swivel elements 5 on the clamping block 3 are each swiveled outward in a removal position so that the clamping lever 6 does not reach under a lateral projection 9 of the clamping bar 2, thus allowing the entire clamping block 3 to be lifted off upward in the z-direction.

In contrast, the swivel elements 5 of the clamping block 3' are each pivoted inwardly to an engagement position so that the clamping levers 6 partially reach behind the projection 9, thereby making it impossible to vertically lift off the clamping block 3' in the z-direction.

Figure 2:
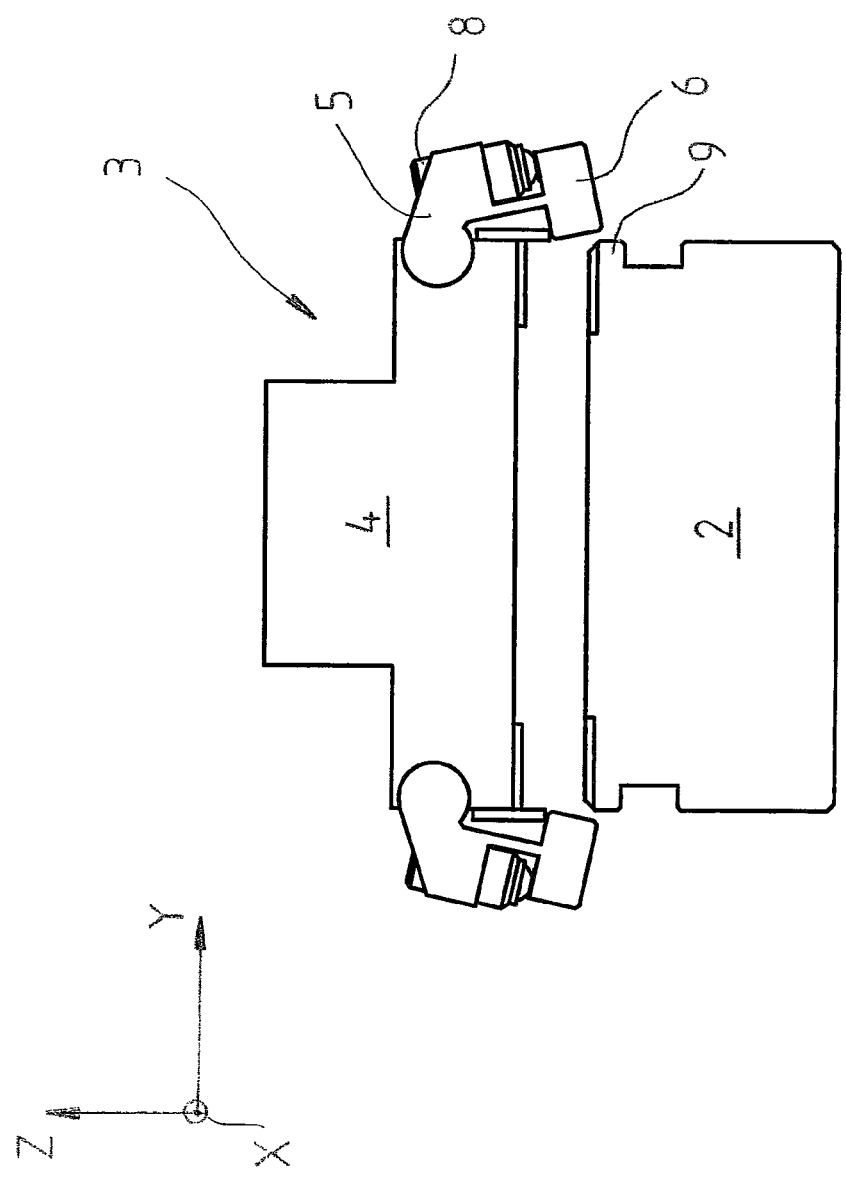
FIG. 2 shows a schematic sectional view of a first embodiment of the present invention.

FIG. 2 shows a schematic sectional view of the clamping block 3 prior to it being mounted on the clamping bar 2 (for the sake of clarity, reference numerals designating the swivel elements that are disposed symmetrically relative to each other as well as other components of the clamping system appear only once). In this figure, it can be especially clearly seen how each swivel element 5 is laterally swiveled outward by a certain amount to a removal position so that the clamping lever 6 is located sufficiently far away on the outside (that is, outside the lateral extent of clamping bar 2) so that the base body 4 with the swivel elements 5 disposed thereon can be lifted off upward in the vertical direction or can be mounted from above on the clamping bar 2. Thus, the inward projecting segments of the levers 6 do not collide with the projection 9 which is formed by a groove on both sides of the clamping bar 2.

Figure 3:
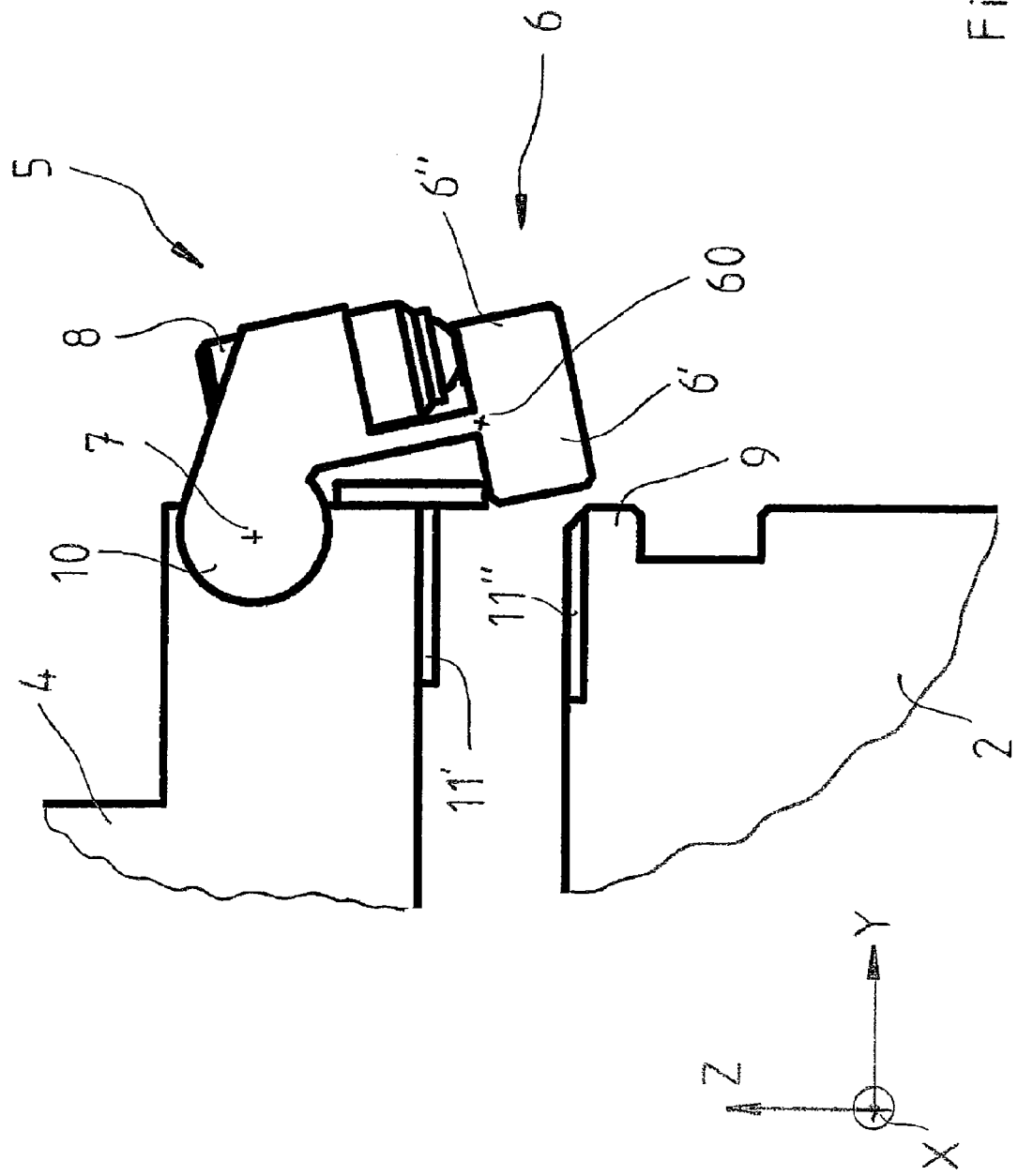
FIG. 3 shows a schematic detailed view of a segment of FIG. 2.

FIG. 3 shows an enlarged section of FIG. 2. Disposed in the base body 4 is the swivel element 5 which, relative to the base body 4, can be swiveled about an axis of rotation 7 by an amount that is predefined by the design. Here, the axis of rotation 7 is oriented parallel to the longitudinal axis x of the clamping bar 2. A projection 10, the cross section of which has the shape of circular segment, of the swivel element 5 projects into complementary recess in the base body 4, thus leading to a cylindrical sliding surface, along which the swivel element 5 can be swiveled relative to the base body 4. The swivel element 5 can be easily separated from the base body 4 by pulling it in the direction of the axis of rotation 7 out of the recess in the base body 4. Conversely, it is similarly easy to reconnect it to the base body.

At the lower end of the swivel element 5, a clamping lever 6 is disposed. The clamping lever 6 has two arms, with a first lever segment 6' being oriented in the direction of the clamping bar 2 and with a second lever segment 6" being oriented outward. The straight two-arm lever 6 can be tilted (at least within narrow boundaries) about an imaginary fulcrum of the lever 60. The lever 6 is integrally formed in one piece with the swivel element 5.

In addition, a clamping element 8 in the form of a screw is disposed in the swivel element 5. The clamping element 8 can be screwed into a thread disposed in the swivel element 5. In the lower segment of the swivel element 5, the clamping element 8 subsequently projects from this swivel element and, depending on the depth of screw engagement, interacts with the second lever segment 6" of the lever 6. By screwing in the clamping element 8, the lower end of the clamping element exerts an actuating force on the second lever segment 6" in such a manner that it is possible to generate a clamping force directed upward in the z-direction on the first lever segment 6'.

Figure 4:
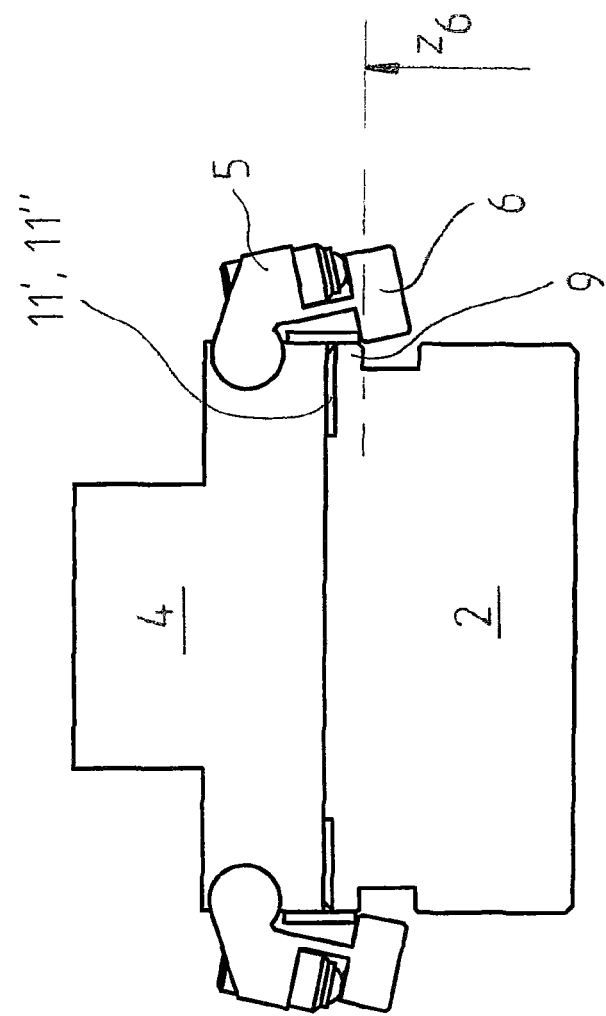
FIG. 4 shows the clamping system seen in FIG. 2 in the mounted but unclamped position.

To this end, first the clamping block 3 is mounted on the clamping bar 2, as schematically represented in FIG. 4. The figure especially illustrates that the first lever segment 6' (designated as such in FIG. 3) occupies exactly the vertical height $z_6$ which is level with a lower edge of the projection 9 of the clamping bar 2. Thus, in the configuration shown in FIG. 4, the swivel element 5 can be swiveled clockwise to an engagement position just far enough to ensure that the lever 6, with its first lever segment 6', engages in the groove of the clamping bar 2 below the projection 9.

Figure 5:
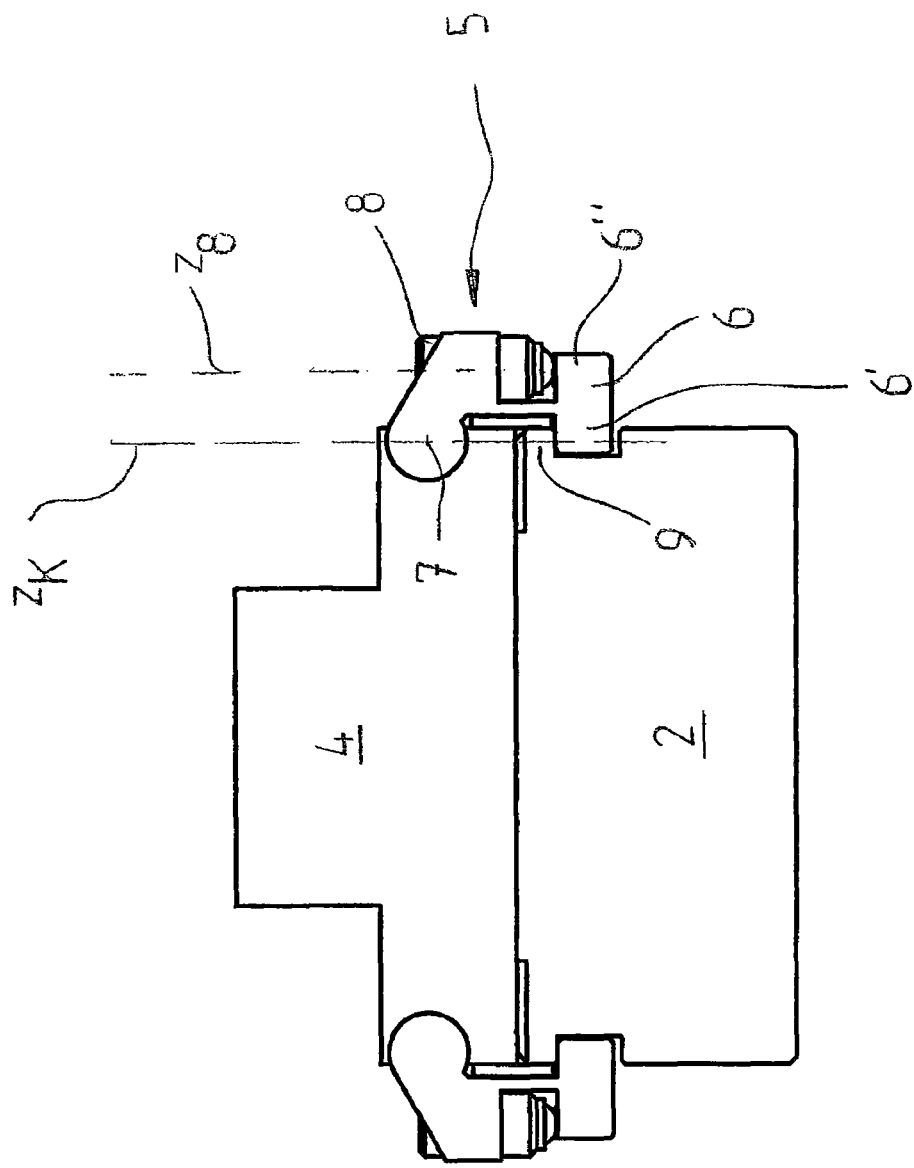
FIG. 5 shows the clamping system seen in FIG. 2 in the clamped position.
Figure 5:
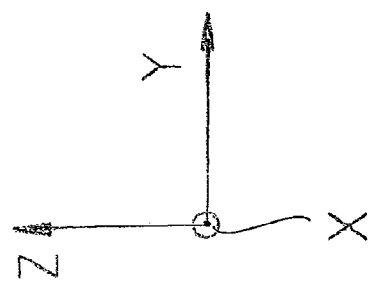

This situation is illustrated in FIG. 5. The first lever segment 6' partially projects into the groove, and its upper edge sits close to the lower boundary surface of the projection 9 of the clamping bar 2. The clamping element 8 in the form of a screw is oriented in such a manner that its imaginary longitudinal axis $z_8$ is aligned nearly or exactly parallel to the z-direction. This makes it possible for the clamping element 8 to be handled easily from the top, thereby obviating lateral access to this element.

FIG. 5 also shows that a (slightly idealized) point of application of the first lever segment 6' in the z-direction comes to be located exactly below the axis of rotation 7 of the swivel element 5. As a result, the clamping forces act perpendicularly between the base body 4 and the clamping bar 2, thus conveniently avoiding undesired clamping forces in the y- or x-direction.

By screwing in the screw 8, a downward clamping force is exerted on the outer, or second, lever segment 6". Accordingly, lever 6 is moved to a clamped position in which an upward clamping force oriented about the fulcrum of the lever acts from below on the first lever segment 6' against the projection 9 of the clamping bar 2, which causes the base body 4 to be clamped in the z-direction onto the clamping bar 2.

Figure 6:
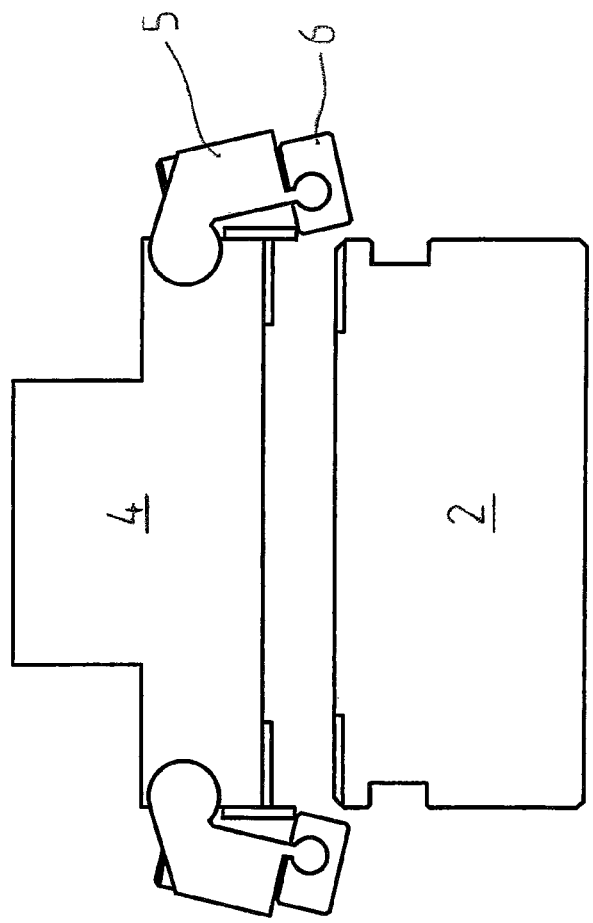
FIG. 6 shows a modified second embodiment with a clamping lever that is detachably disposed on the swivel element.
Figure 7:
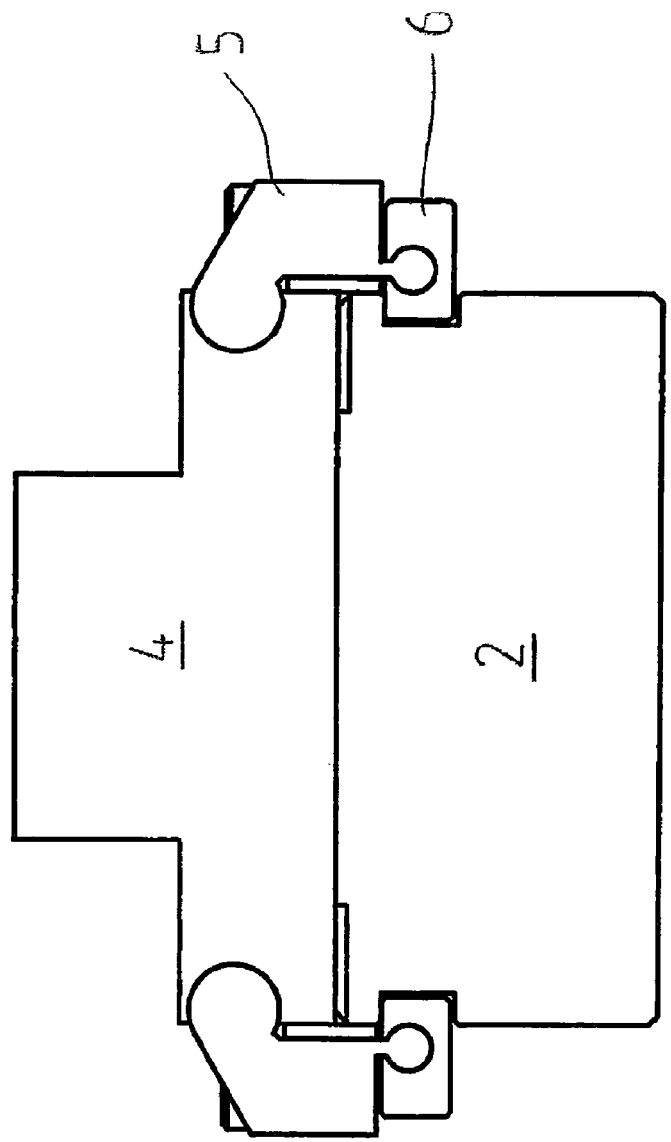
FIG. 7 shows the embodiment illustrated in FIG. 6 in the clamped position.

A slightly different type of lever attachment to the swivel element 5 is illustrated in FIGS. 6 and 7. The lever 6 is designed so that it can be detached from the swivel element 6, and a projection which projects downward from the swivel element 5 and the cross section of which has the shape of circular segment serves as the inside joint element. The lever 6, which in its simplest embodiment essentially has a rectangular cross section, comprises a recess complementary to the projection so that, as the outside joint element, it can be slid onto the projection and, depending on the design, can be swiveled or tilted by a certain amount relative to the swivel element 5. Otherwise, the lever 6 shown in FIGS. 6 and 7 serves a function identical to that of the previously described lever that is integrally formed in one piece with the swivel element 5. Thus, FIG. 7 illustrates the clamped position, with the lever 6, with a first lever segment, again engaging in the groove of the clamping bar 2.

The upper surface of the clamping bar 2 comprises a locking profile 11" which interacts with a locking profile 11' disposed on the lower surface of the base body 4. Each locking profile has the form of a toothed bar. Thus, the base body 4 can be mounted on the clamping bar 2 in the individual x-positions defined by the teeth along the x-axis of the clamping bar 2. A rough (manual) positioning of the clamping block on the clamping bar 2 is sufficient for the clamping block to accurately occupy the x-position since the subsequent alignment in the x-direction takes place automatically in that the individual teeth of the oppositely lying locking profiles 11', 11" mesh with one another. As a result, the reproducible positioning of a clamping block in certain positions of the clamping bar 2 is considerably simplified. At the same time, the locking profile 11', 11" causes the clamping block and the clamping bar to be secured in place relative to each other in the x-direction so that the actual clamped connection to a large extent does not have to absorb such forces.

As used herein, whether in the above description or the following claims, the terms "comprising," "including," "carrying," "having," "containing," "involving," and the like are to be understood to be open-ended, that is, to mean including but not limited to. Furthermore, references to relative position such as "above," "below," "upper," and "lower" and the like are to be understood as references to relative positions from the orientation of elements shown in the drawings. Additionally, any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A clamping system including:
   (a) a clamping bar which extends in a longitudinal direction (x), in a lateral direction (y) at right angles to the longitudinal direction (x), and in a depth direction (z) perpendicular to the longitudinal direction (x) and lateral direction (y);
   (b) a clamping block adapted to be positioned in a mounted position at a desired location along the longitudinal direction (x) on an upper surface of the clamping bar, the clamping block including a base body;
   (c) a swivel element pivotally mounted on the base body so as to be pivotable about an axis of rotation relative to the base body between an engagement position and a removal position;
   (d) a clamping lever mounted on the swivel element which, when the swivel element is in the engagement position and the clamping block is in the mounted position, is positionable in a clamped position to exert a clamping force with a first lever segment of the clamping lever on a portion of the clamping bar so as to force at least a portion of the clamping block against the upper surface of the clamping bar to clamp the clamping block to the clamping bar; and
   (e) wherein moving the swivel element to the removal position places the first lever segment outside of the lateral extent of the clamping bar in the lateral direction (y) so that the clamping block is movable in the depth direction (z) away from the upper surface of the clamping bar.

2. The clamping system of claim 1 wherein:
   (a) the swivel element in the engagement position extends downwardly from the base body past a first lateral edge of the clamping bar;
   (b) the clamping bar first lateral edge includes a lateral projection; and
   (c) the first lever segment in the clamped position contacts a lower surface of the lateral projection.

3. The clamping system of claim 1 wherein the axis of rotation extends parallel to the longitudinal direction (x).

4. The clamping system of claim 3 wherein the swivel element includes a projection having a circular cross section and the base body includes a complementary shaped recess, the swivel element projection being insertable into the base body recess.

5. The clamping system of claim 1 further including a clamping element operable to selectively introduce an actuating force into the clamping lever to cause the clamping lever to exert the clamping force on the clamping bar.

6. The clamping system of claim 5 wherein the clamping element is disposed on or in the swivel element.

7. The clamping system of claim 5 wherein the clamping element comprises a screw, the longitudinal axis of which is oriented in the depth direction (z) when the swivel element is in the engagement position.

8. The clamping system of claim 6 further including a quick-release device mounted on the swivel element and adapted to selectively operate on the clamping element to cause the clamping element to introduce the actuating force into the clamping lever.

9. The clamping system of claim 1 wherein the clamping lever is integrally formed in one piece with the swivel element.

10. The clamping system of claim 1 wherein the clamping lever is detachably connected to the swivel element.

11. The clamping system of claim 1 wherein:
   (a) the clamping lever comprises a two-arm lever in which the first lever segment represents one lever arm and a second lever segment represents an opposite lever arm, with an imaginary fulcrum of the lever lying between the first lever segment and second lever segment; and
   (b) the clamping force is introduced into the first lever segment from the second lever segment.

12. The clamping system of claim 1 further including:
   (a) a first locking profile associated with the upper surface of the clamping bar; and
   (b) a second locking profile associated with a lower surface of the base body, the second locking profile being complementary to the first locking profile so that when the clamping block is in the mounted position, the first locking profile engages the second locking profile so as to define the position of the clamping block relative to the clamping bar in the longitudinal direction (x).

13. The clamping system of claim 12 wherein the first locking profile and the second locking profile each comprise a series of teeth adapted to reside in an interdigited relationship to define the position of the clamping block relative to the clamping bar in the longitudinal direction (x).

14. The clamping system of claim 1 wherein an imaginary line of application of the clamping force introduced by the clamping lever into the clamping bar intersects with the axis of rotation of the swivel element.

15. The clamping system of claim 1 wherein the swivel element is mounted at a first lateral side of the base body and further including:
   (a) an additional swivel element pivotally mounted on the base body at a second lateral side so as to be pivotable about an additional axis of rotation relative to the base body between an engagement position and a removal position for the additional swivel element;
   (b) an additional clamping lever mounted on the additional swivel element which, when the additional swivel element is in the engagement position and the clamping block is in the mounted position, is positionable in an additional clamped position to exert an additional clamping force with a first lever segment of the additional clamping lever on an additional portion of the clamping bar so as to assist the clamping force to force at least a portion of the clamping block against the upper surface of the clamping bar to clamp the clamping block to the clamping bar; and
   (c) wherein moving the additional swivel element to the removal position for that element places the first lever segment of the additional swivel element outside of the lateral extent of the clamping bar at the second lateral side of the clamping bar so that the clamping block is movable in the depth direction (z) away from the upper surface of the clamping bar.

16. A clamping block adapted to be placed in a mounted position at a desired location along the longitudinal direction (x) on an upper surface of a clamping bar, the clamping bar also extending in a lateral direction (y) at right angles to the longitudinal direction (x), and in a depth direction (z) perpendicular to the longitudinal direction (x) and lateral direction (y), the clamping block including:
   (a) a base body;
   (b) a swivel element pivotally mounted on the base body so as to be pivotable about an axis of rotation relative to the base body between an engagement position and a removal position;
   (c) a clamping lever mounted on the swivel element which, when the swivel element is in the engagement position and the clamping block is in the mounted position, is positionable in a clamped position to exert a clamping force with a first lever segment of the clamping lever on a portion of the clamping bar so as to force at least a portion of the clamping block against the upper surface of the clamping bar to clamp the clamping block to the clamping bar; and
   (d) wherein moving the swivel element to the removal position places the first lever segment outside of the lateral extent of the clamping bar in the lateral direction (y) so that the clamping block is movable in the depth direction (z) away from the upper surface of the clamping bar.

17. The clamping block of claim 16 wherein:
   (a) the swivel element in the engagement position extends downwardly from the base body past a first lateral edge of the clamping bar;
   (b) the clamping bar first lateral edge includes a lateral projection; and
   (c) the first lever segment in the clamped position contacts a lower surface of the lateral projection.

18. The clamping block of claim 16 wherein the swivel element includes a projection having a circular cross section and the base body includes a complementary shaped recess, the swivel element projection being insertable into the base body recess.

19. The clamping block of claim 16 further including a clamping element operable to selectively introduce an actuating force into the clamping lever to cause the clamping lever to exert the clamping force on the clamping bar, the clamping element comprising a screw, the longitudinal axis of which is oriented in the depth direction (z) when the swivel element is in the engagement position.

20. The clamping block of claim 16 wherein the swivel element is mounted at a first lateral side of the base body and further including:
   (a) an additional swivel element pivotally mounted on the base body at a second lateral side so as to be pivotable about an additional axis of rotation relative to the base body between an engagement position and a removal position for the additional swivel element;

(b) an additional clamping lever mounted on the additional swivel element which, when the additional swivel element is in the engagement position and the clamping block is in the mounted position, is positionable in an additional clamped position to exert an additional clamping force with a first lever segment of the additional clamping lever on an additional portion of the clamping bar so as to assist the clamping force to force at least a portion of the clamping block against the upper surface of the clamping bar to clamp the clamping block to the clamping bar; and (c) wherein moving the additional swivel element to the removal position for that element places the first lever segment of the additional swivel element outside of the lateral extent of the clamping bar at the second lateral side of the clamping bar so that the clamping block is movable in the depth direction (z) away from the upper surface of the clamping bar.

* * * * *